United States Patent
Arekar et al.

(10) Patent No.: US 10,412,293 B2
(45) Date of Patent: Sep. 10, 2019

(54) TRANSMITTER OPTICAL SUB-ASSEMBLY HAVING IMPROVED RECEPTACLE

(71) Applicant: FOXCONN INTERCONNECT TECHNOLOGY LIMITED, Grand Cayman (KY)

(72) Inventors: Chaitanya Arekar, Dublin, CA (US); David Meadowcroft, San Jose, CA (US)

(73) Assignee: FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 0 days.

(21) Appl. No.: 15/614,637

(22) Filed: Jun. 6, 2017

(65) Prior Publication Data

US 2018/0348452 A1 Dec. 6, 2018

(51) Int. Cl.
G02B 6/42 (2006.01)
G02B 7/04 (2006.01)
H04N 5/232 (2006.01)
G02B 9/58 (2006.01)
H04N 5/225 (2006.01)

(52) U.S. Cl.
CPC ......... *H04N 5/23212* (2013.01); *G02B 6/421* (2013.01); *G02B 6/4292* (2013.01); *G02B 7/04* (2013.01); *G02B 9/58* (2013.01); *H04N 5/2254* (2013.01); *G02B 6/4262* (2013.01)

(58) Field of Classification Search
CPC .................................. G02B 6/42; G02B 7/04
USPC .......................................................... 385/91
See application file for complete search history.

(56) References Cited

U.S. PATENT DOCUMENTS

| 6,953,290 B2 | 10/2005 | Nakanishi et al. |
| 7,178,989 B2 | 2/2007 | Yoshida et al. |
| 7,350,979 B2 | 4/2008 | Mizue et al. |
| 9,297,972 B2* | 3/2016 | Logan, Jr. ............. G02B 6/4281 |
| 2004/0136660 A1* | 7/2004 | Cheng ................... G02B 6/4203 385/88 |
| 2005/0180754 A1* | 8/2005 | Mizue ................... G02B 6/4246 398/135 |
| 2005/0238295 A1 | 10/2005 | Yonemura |
| 2006/0220038 A1* | 10/2006 | Iguchi .................. H01L 31/0203 257/82 |
| 2006/0285805 A1* | 12/2006 | Healy ..................... G02B 6/421 385/92 |
| 2007/0058906 A1* | 3/2007 | Han ....................... G02B 6/3877 385/60 |
| 2007/0081770 A1* | 4/2007 | Fisher ................... G02B 6/4201 385/92 |
| 2008/0124029 A1* | 5/2008 | Mitamura ............. G02B 6/3874 385/60 |
| 2008/0170827 A1* | 7/2008 | Mitamura ............. G02B 6/3846 385/78 |

(Continued)

*Primary Examiner* — Kaveh C Kianni
(74) *Attorney, Agent, or Firm* — Wei Te Chung; Ming Chieh Chang

(57) ABSTRACT

A transmitter optical sub-assembly includes a body and a receptacle assembled to a front side of the body, the receptacle including a nose body, a split sleeve enclosed by the nose body, a first body disposed behind the split sleeve, and a fiber stub either glued or shrink fit or pressed fit on to the first body, a rear end of the split sleeve being slip fitted on to the fiber stub; wherein the nose body is made from deep drawing or cold forging process and is attached on to a front surface of the body.

4 Claims, 20 Drawing Sheets

(56) References Cited

U.S. PATENT DOCUMENTS

| | | | |
|---|---|---|---|
| 2009/0304337 A1* | 12/2009 | Sato | G02B 6/3807 385/92 |
| 2010/0054666 A1* | 3/2010 | Michitsuji | G02B 6/421 385/60 |
| 2010/0316338 A1* | 12/2010 | Shono | G02B 6/4201 385/93 |
| 2011/0142086 A1* | 6/2011 | Watanabe | H01S 5/02415 372/34 |
| 2012/0269486 A1* | 10/2012 | Ishii | G02B 6/4246 385/92 |
| 2013/0258468 A1* | 10/2013 | Fukui | G02F 1/0955 359/484.03 |
| 2013/0279862 A1* | 10/2013 | Ishii | G02B 6/4246 385/92 |
| 2014/0355997 A1* | 12/2014 | Miao | H04B 10/40 398/135 |
| 2015/0378107 A1* | 12/2015 | Akashi | G02B 6/421 398/139 |
| 2016/0047998 A1* | 2/2016 | Amirkiai | G02B 6/43 385/14 |
| 2017/0315303 A1* | 11/2017 | Akashi | G02B 6/36 |

* cited by examiner

TRANSMITTER OPTICAL SUB-ASSEMBLY HAVING IMPROVED RECEPTACLE

BACKGROUND OF THE INVENTION

1. Field of the Invention

The present invention relates to a transmitter optical sub-assembly having a receptacle, and more particularly to an improved receptacle having low manufacturing cost and high manufacturing accuracy.

2. Description of Related Arts

As the demand for data throughput increases dramatically, the data rate in the optical link is pushed higher. One way to realize higher data rate is transmitting different signals carried by light with different wavelengths within one optical fiber. Traditionally, for signal mode optical transceiver, transmitter optical sub-assembly (hereinafter abbreviated as TOSA) forms a critical part. Generally, as shown in FIGS. 1-5, TOSA 100 is made up of a receptacle 1 and TOSA body 2. Currently, receptacle 1 is made of precision machined parts split sleeve 10 and fiber stub 20, while the housing is made of a laser, a lens, a monitor diode and/or a laser driver. The precision machined parts increase the cost of making the receptacle 1.

SUMMARY OF THE INVENTION

An object of the present invention is to provide a low-cost transmitter optical sub-assembly.

To achieve the above-mentioned object, a transmitter optical sub-assembly comprises: a body; and a receptacle assembled to a front side of the body, the receptacle including a nose body, a split sleeve enclosed by the nose body, a first body disposed behind the split sleeve, and a fiber stub either glued or shrink fit or pressed fit on to the first body, a rear end of the split sleeve being slip fitted on to the fiber stub; wherein the nose body is made from deep drawing or cold forging process and is attached on to a front surface of the body.

According to the present invention, the transmitter optical sub-assembly uses a receptacle which can be manufactured in reduced cost.

DETAILED DESCRIPTION OF THE PREFERRED EMBODIMENT

Figure 1:
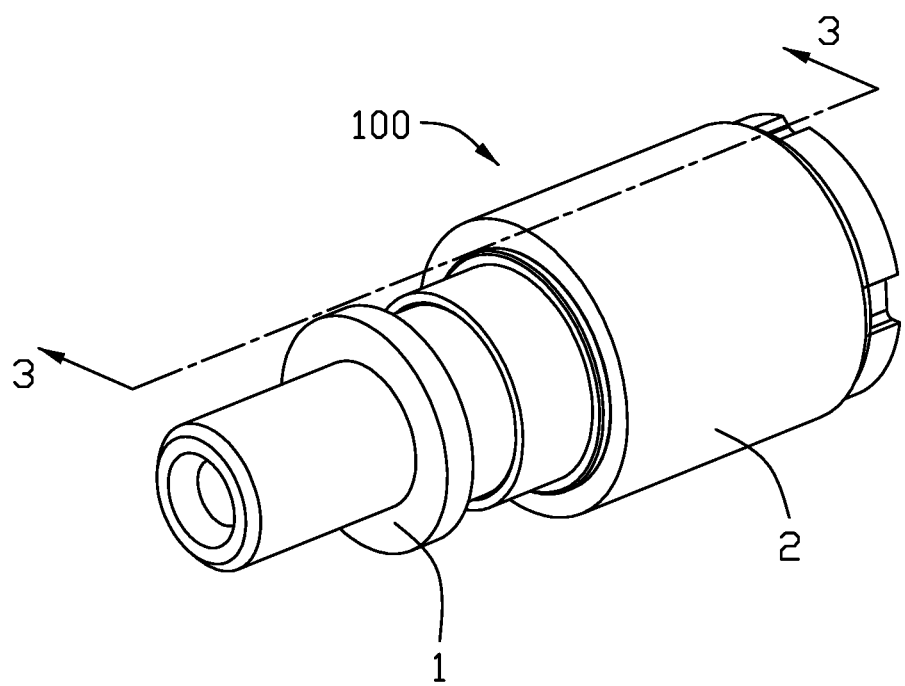
FIG. 1 is a perspective view of a traditional transmitter optical sub-assembly in accordance with prior art.
Figure 2:
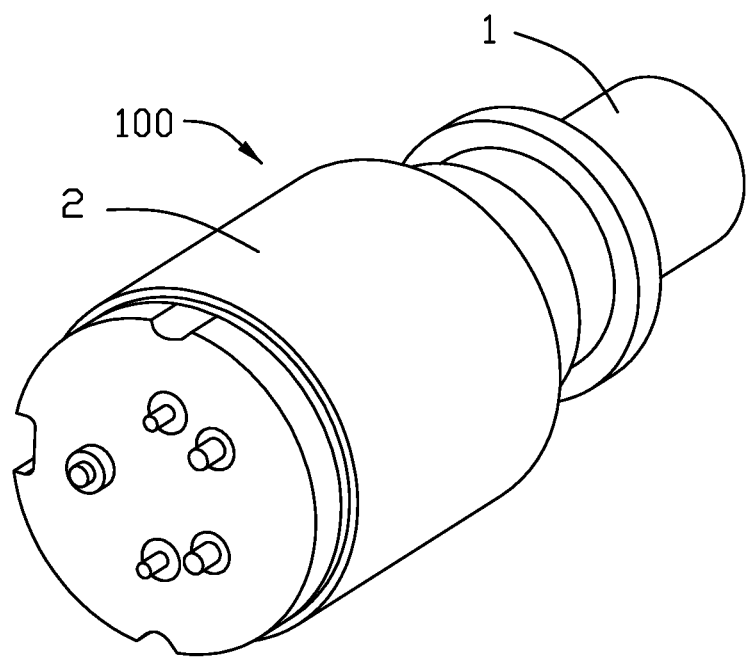
FIG. 2 is a perspective view similar to the FIG. 1, but from a different aspect.
Figure 3:
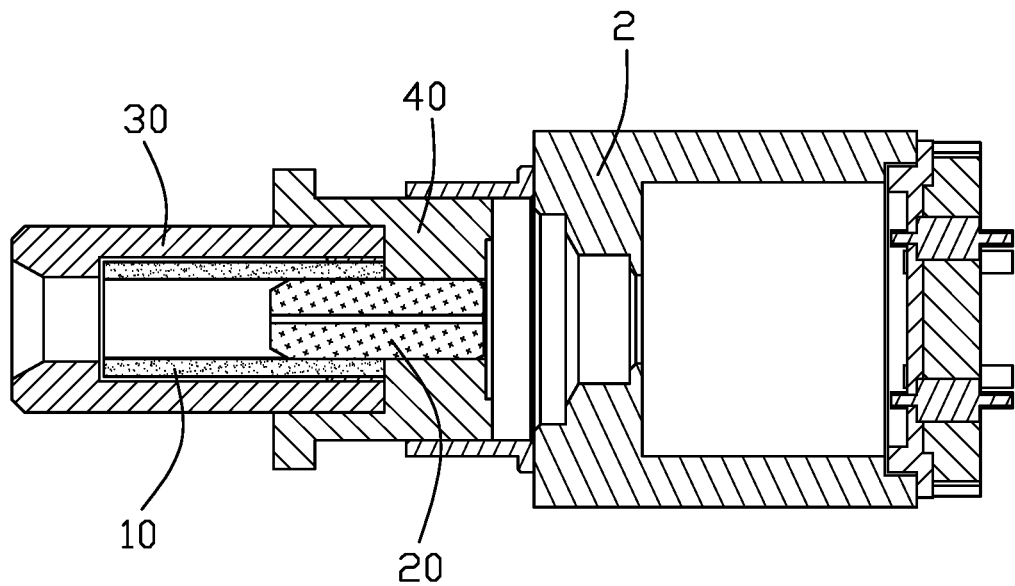
FIG. 3 is a cross-sectional view of the traditional transmitter optical sub-assembly as shown in FIG. 1, taken along line 3-3 in FIG. 1.
Figure 4:
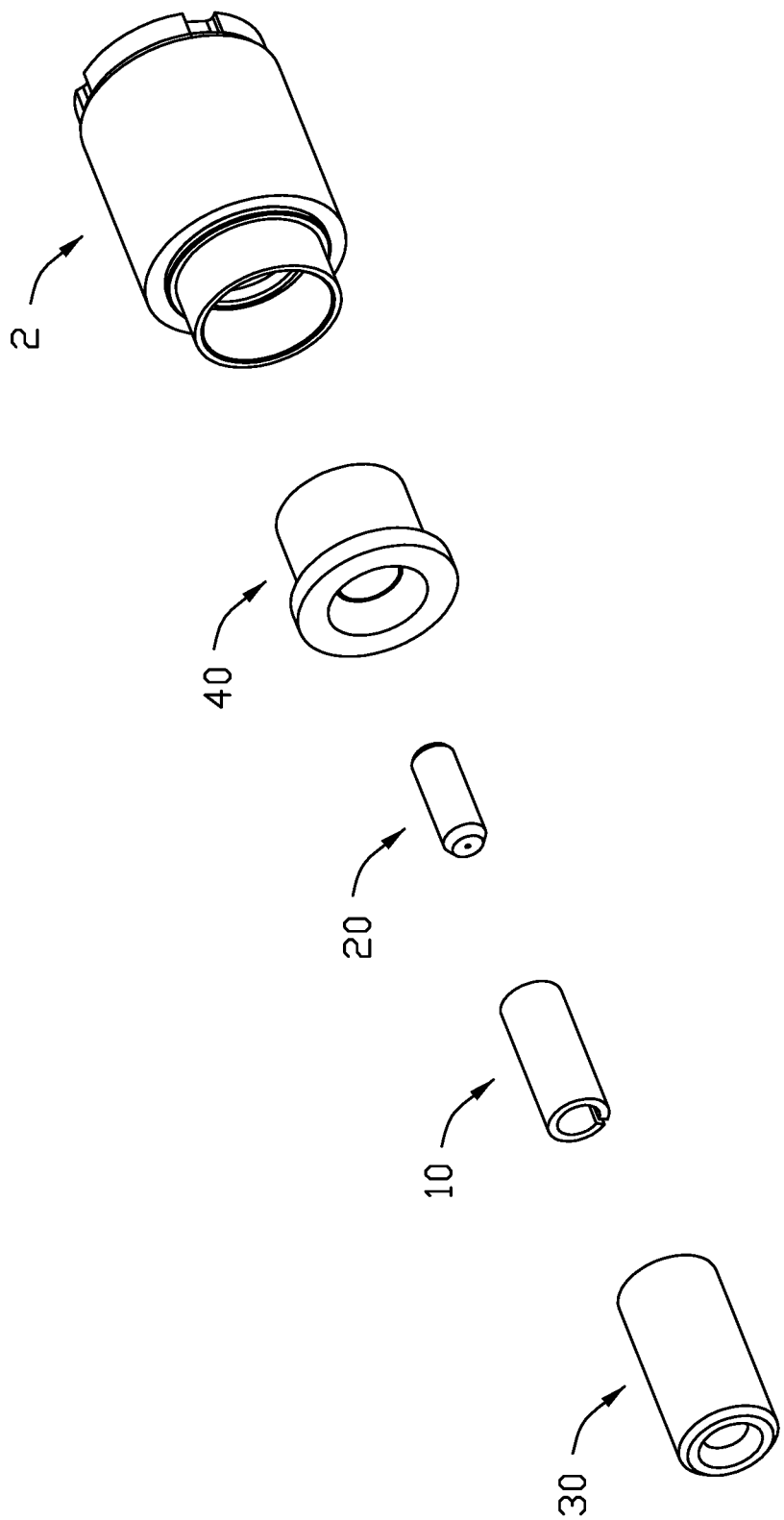
FIG. 4 is an exploded view of the traditional transmitter optical sub-assembly as shown in FIG. 1.
Figure 5:
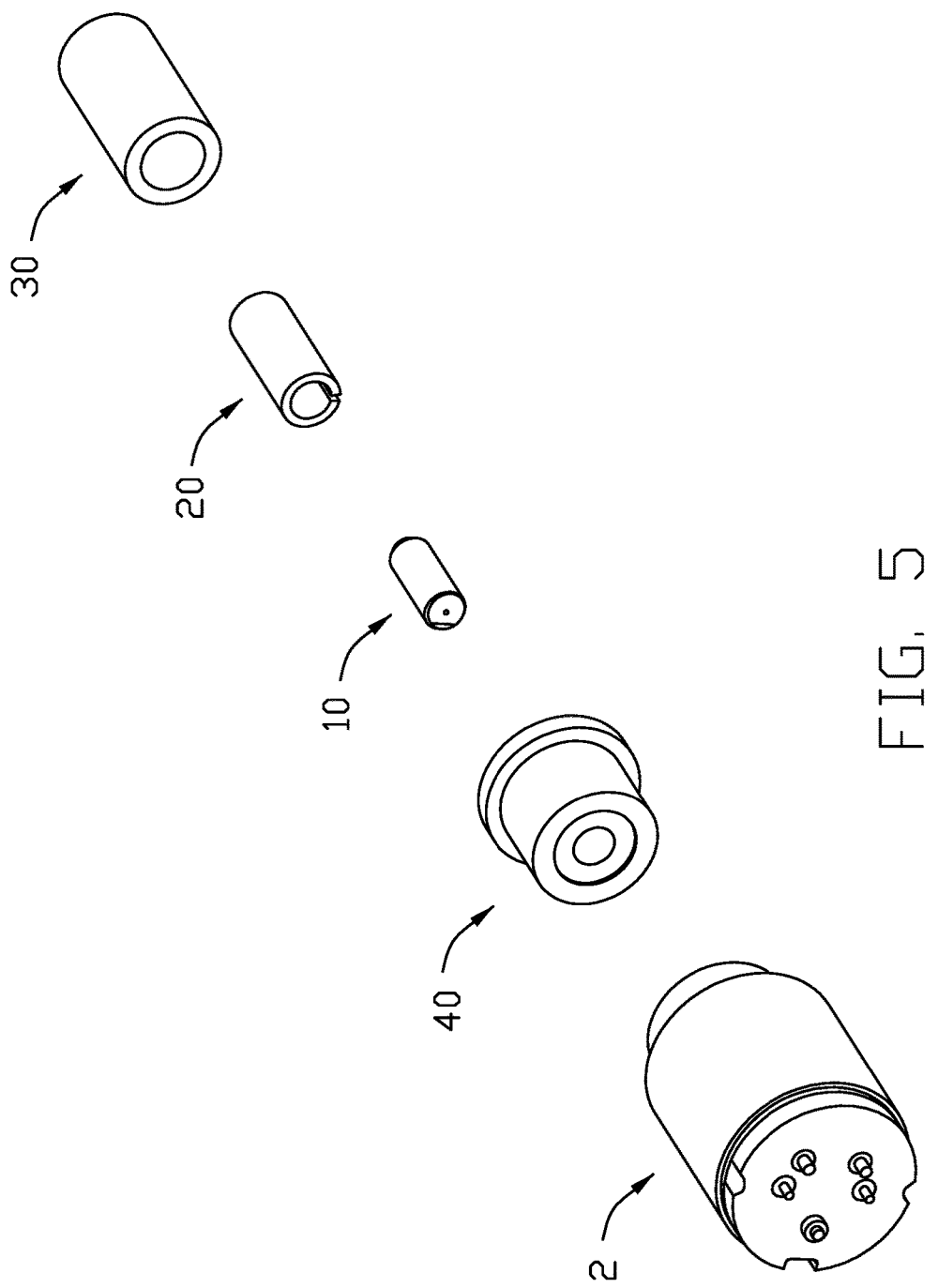
FIG. 5 is a exploded view similar to the FIG. 4, but from a different aspect.
Figure 6:
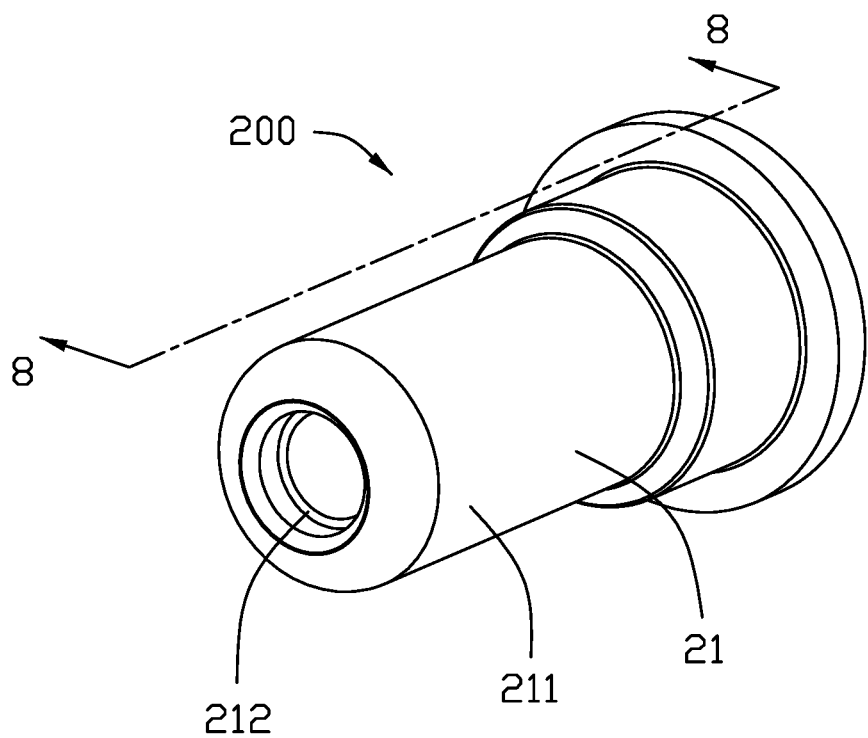
FIG. 6 is a perspective view of a first embodiment of the transmitter optical sub-assembly in accordance with the present invention.
Figure 7:
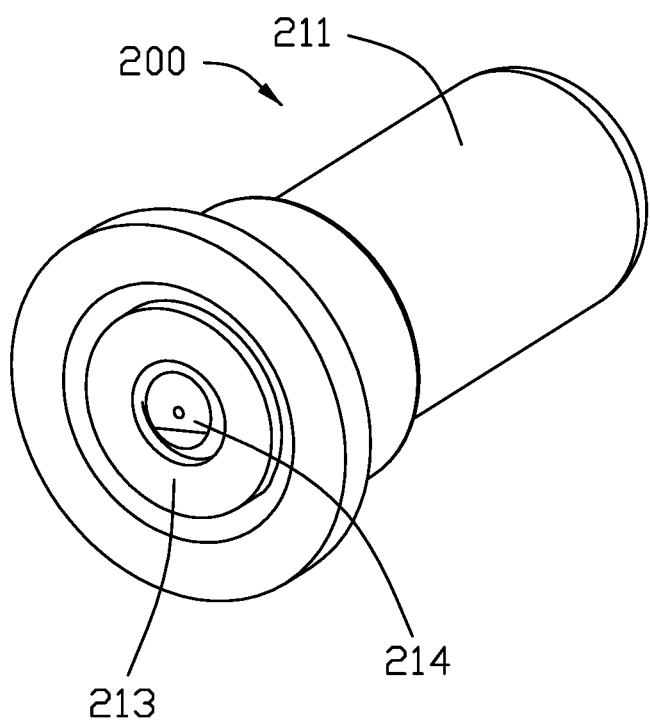
FIG. 7 is a perspective view similar to the FIG. 6, but from a different aspect.
Figure 8:
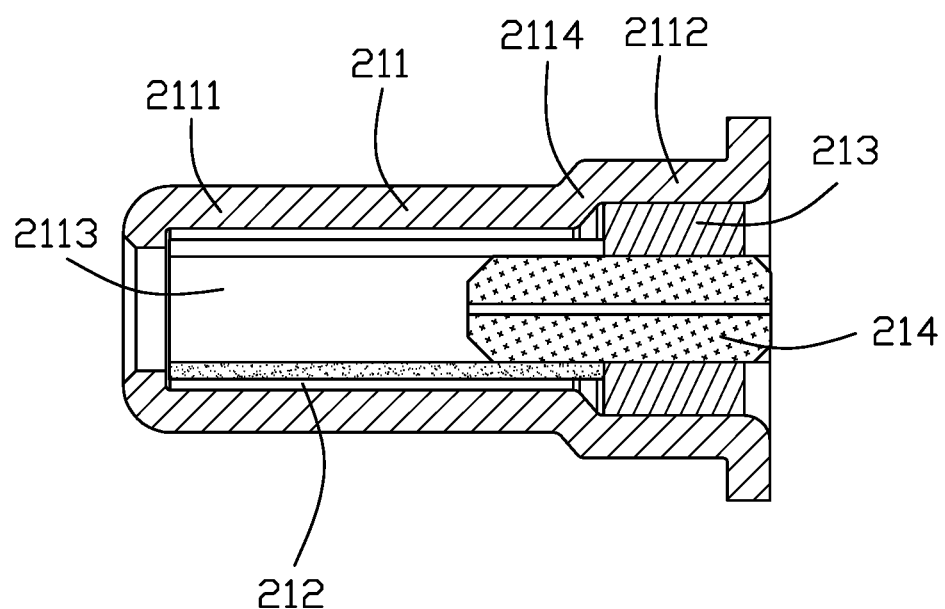
FIG. 8 is a cross-sectional view of the transmitter optical sub-assembly as shown in FIG. 6, taken along line 8-8 in FIG. 6.
Figure 9:
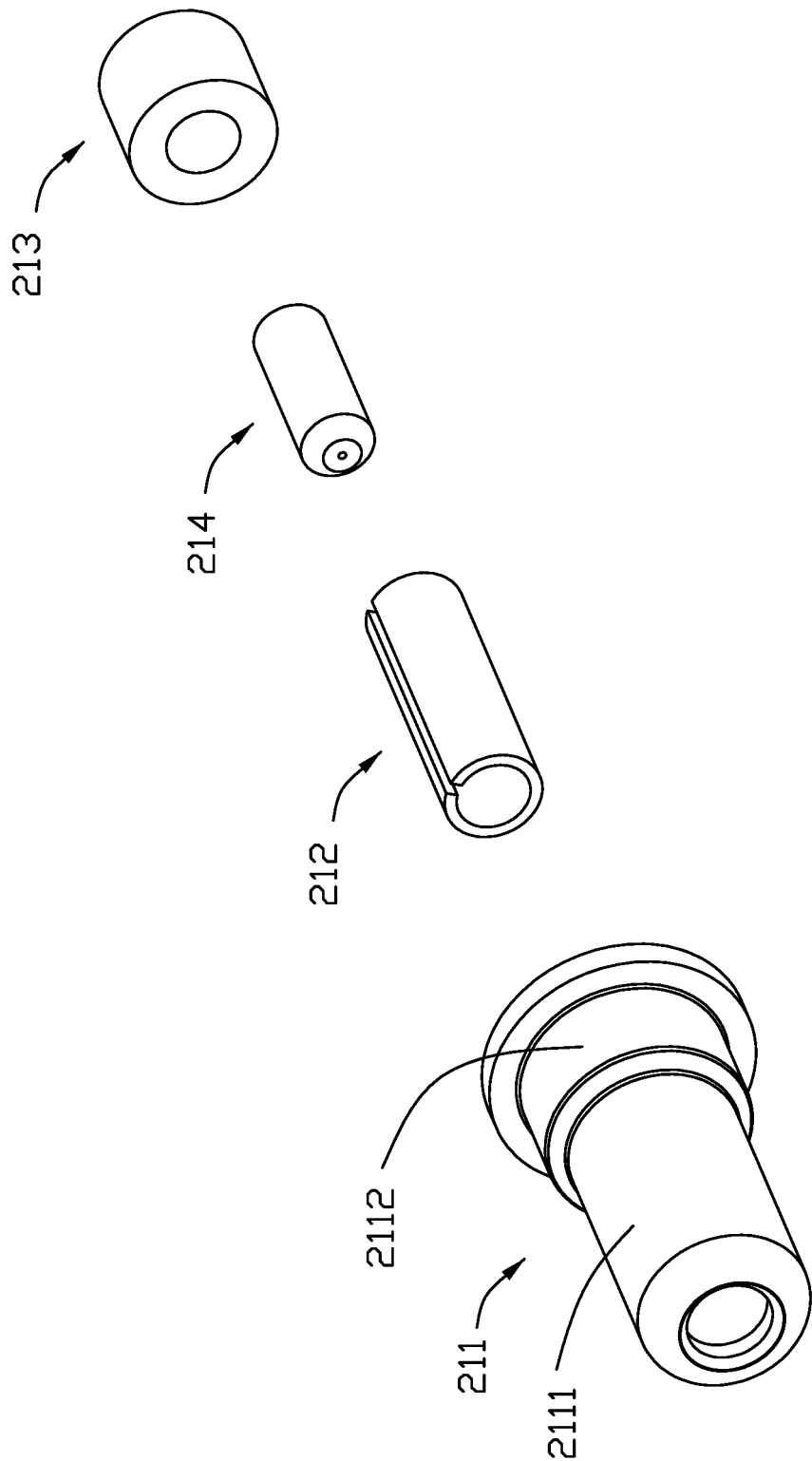
FIG. 9 is an exploded view of the traditional transmitter optical sub-assembly as shown in FIG. 7.
Figure 10:
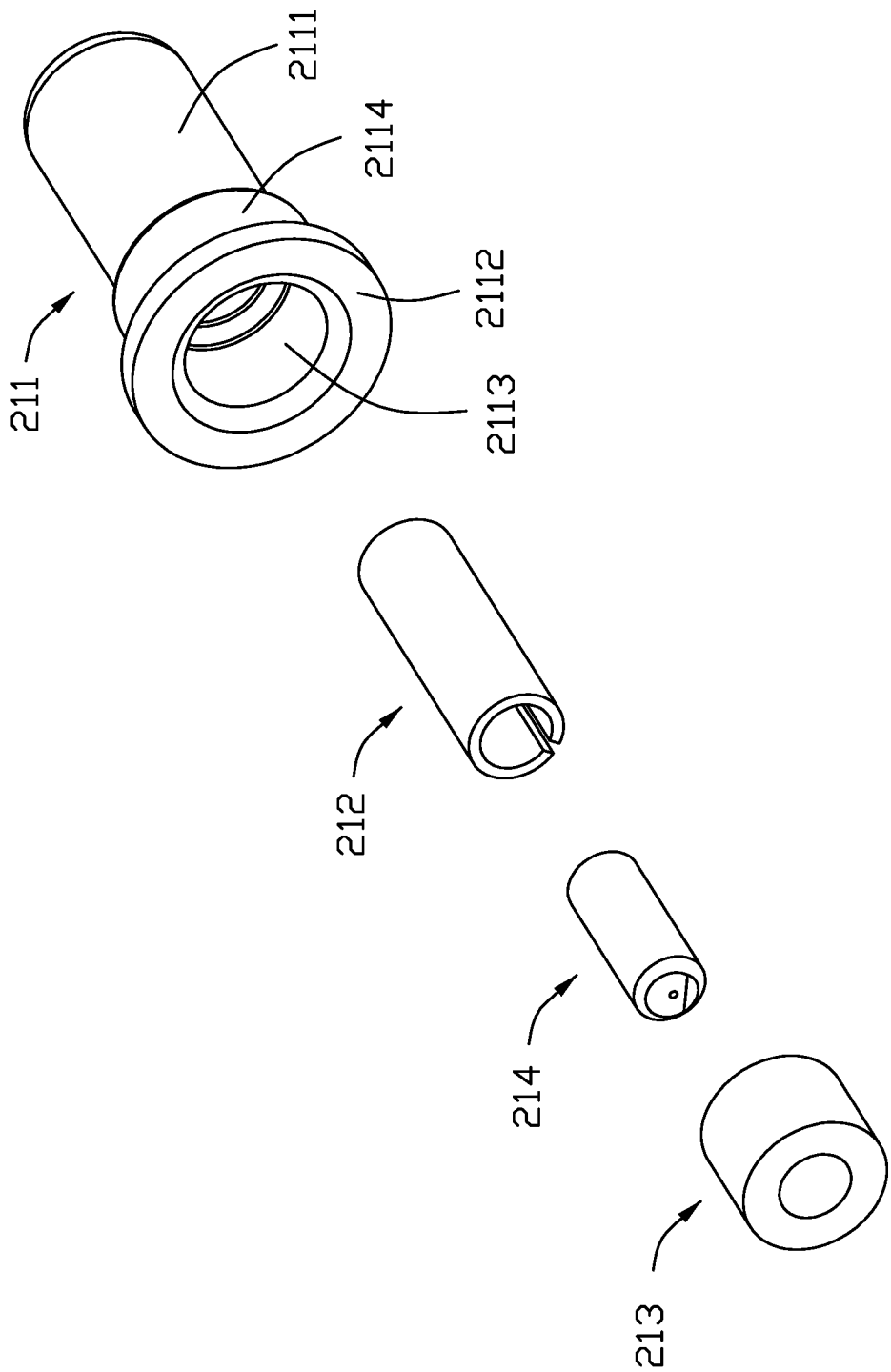
FIG. 10 is a exploded view similar to the FIG. 9, but from a different aspect.
Figure 11:
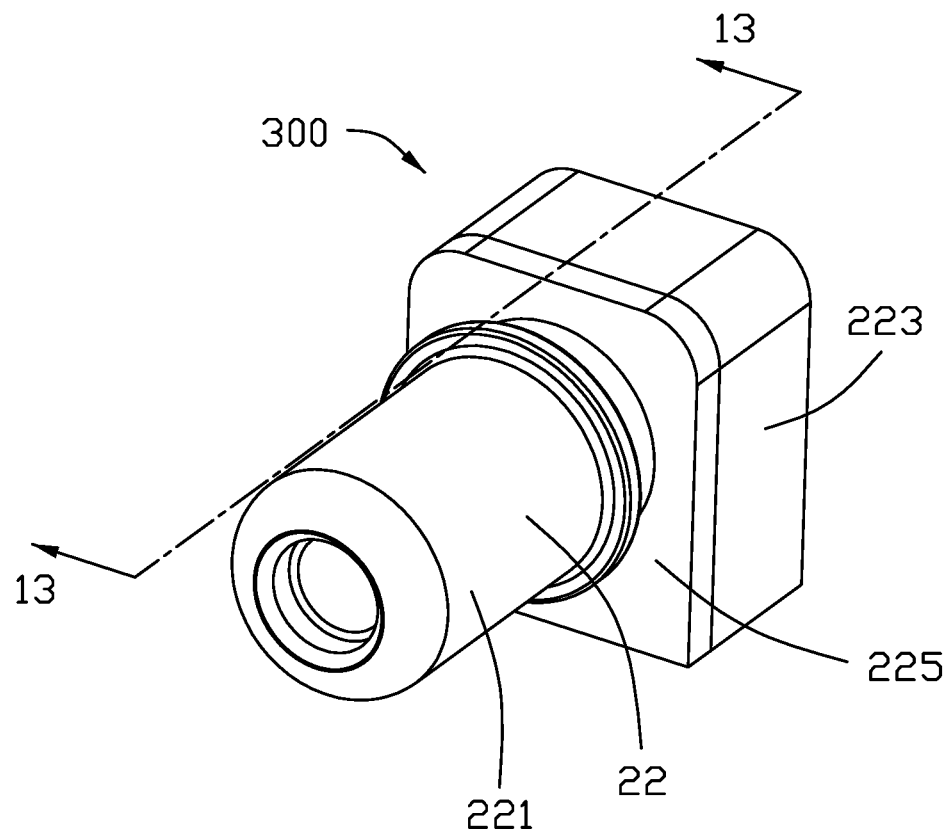
FIG. 11 is a perspective view of a second embodiment of the transmitter optical sub-assembly in accordance with the present invention.
Figure 12:
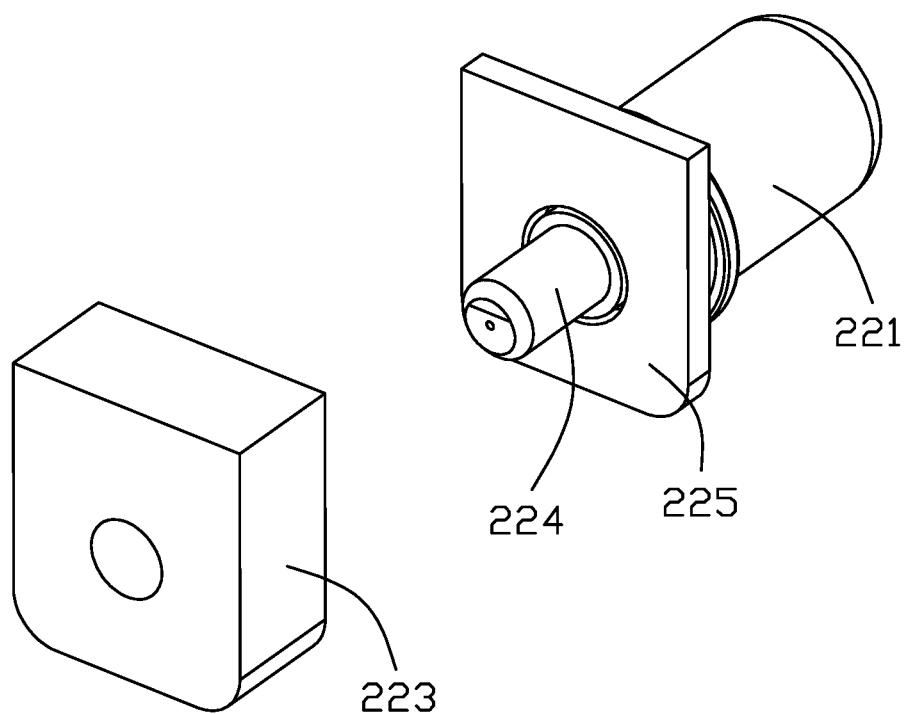
FIG. 12 is a perspective view similar to the FIG. 11, but from a different aspect.
Figure 13:
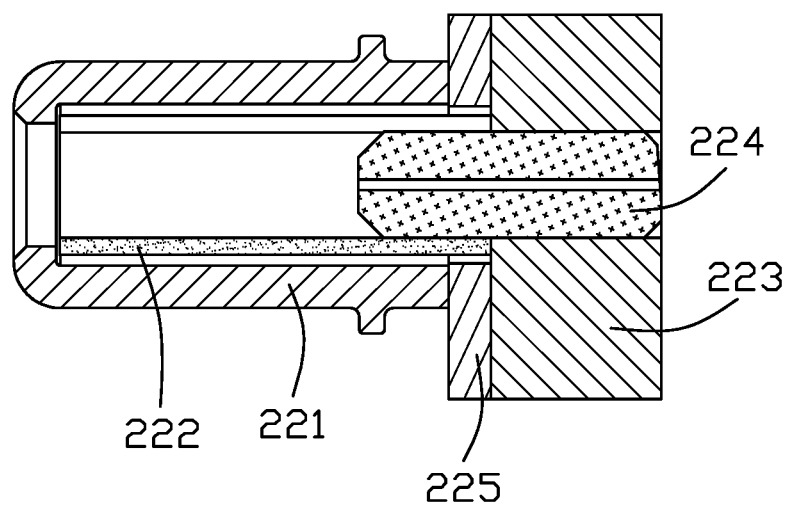
FIG. 13 is a cross-sectional view of the transmitter optical sub-assembly as shown in FIG. 11, taken along line 13-13 in FIG. 11.
Figure 14:
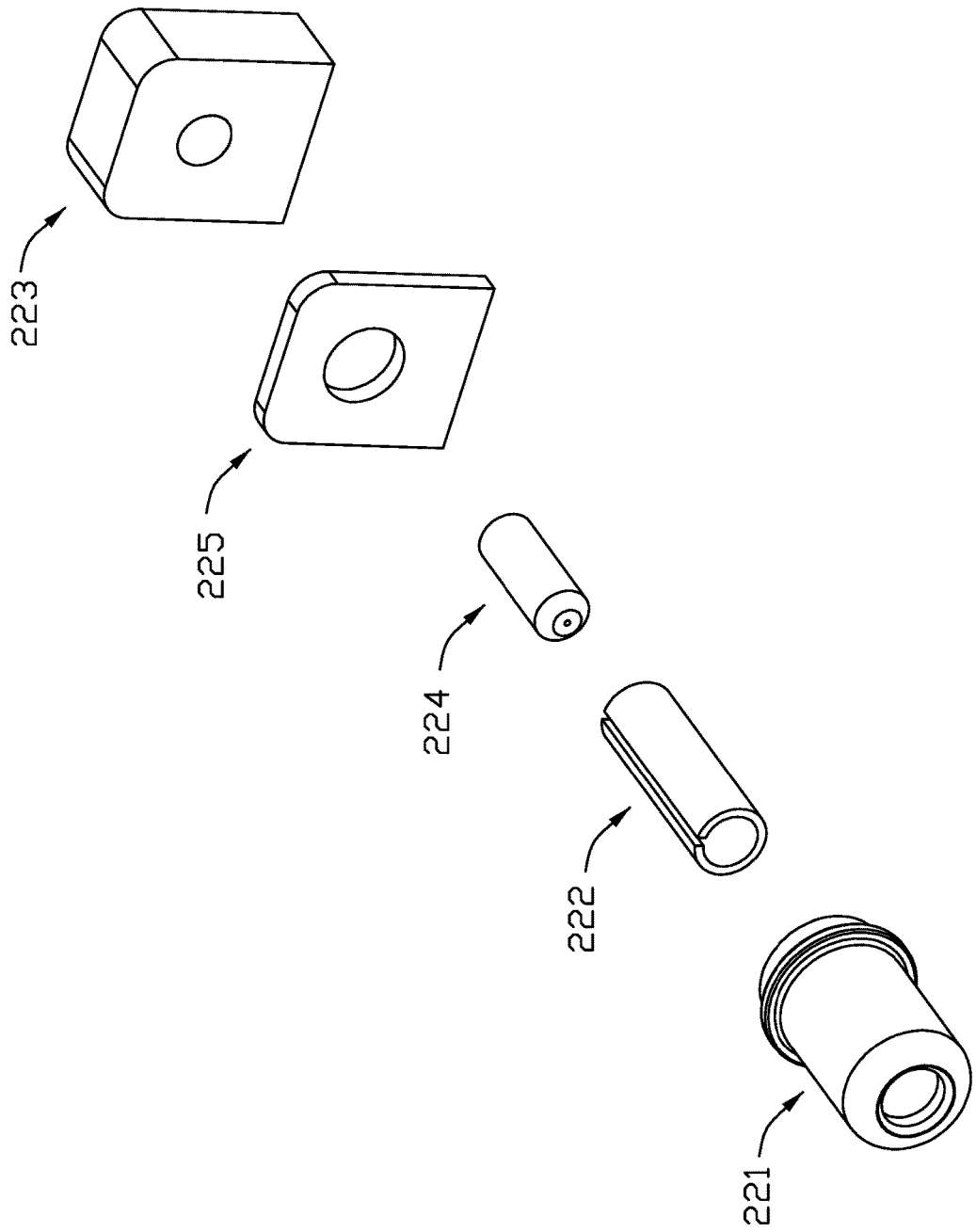
FIG. 14 is an exploded view of the traditional transmitter optical sub-assembly as shown in FIG. 13.
Figure 15:
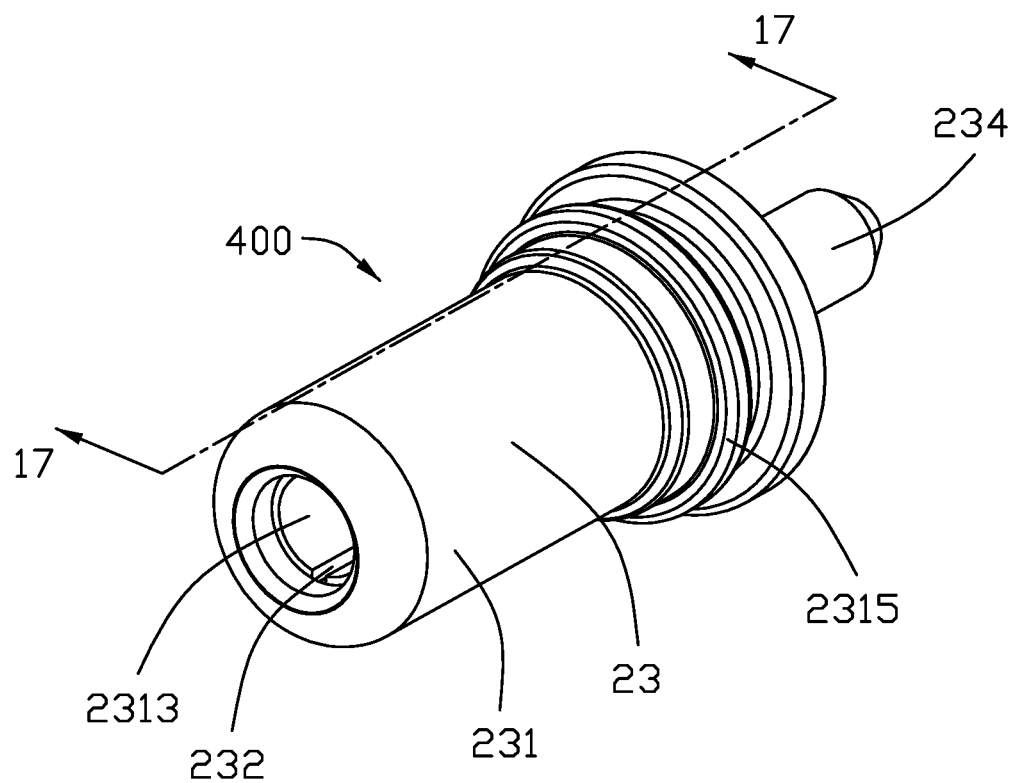
FIG. 15 is a perspective view of a third embodiment of the transmitter optical sub-assembly in accordance with the present invention.
Figure 16:
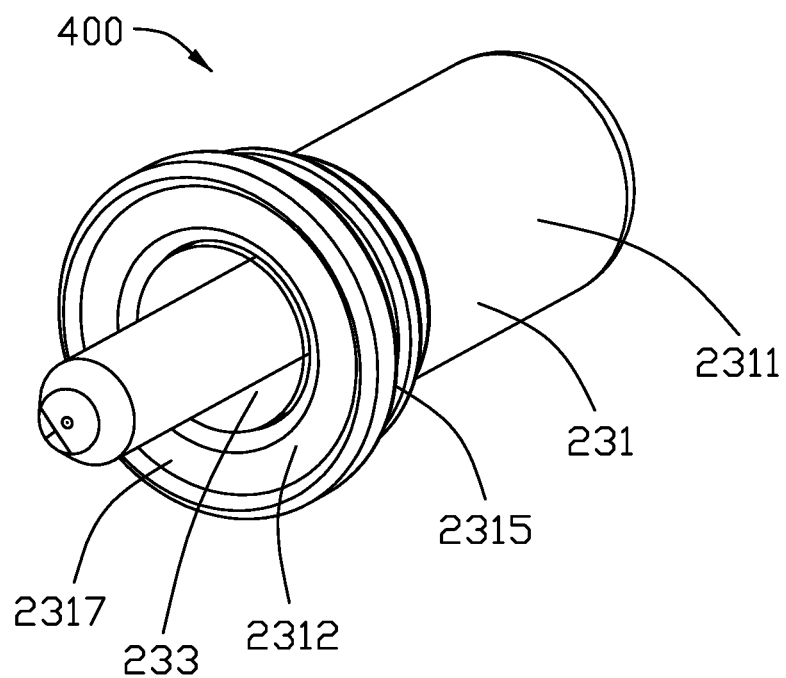
FIG. 16 is a perspective view similar to the FIG. 15, but from a different aspect.
Figure 17:
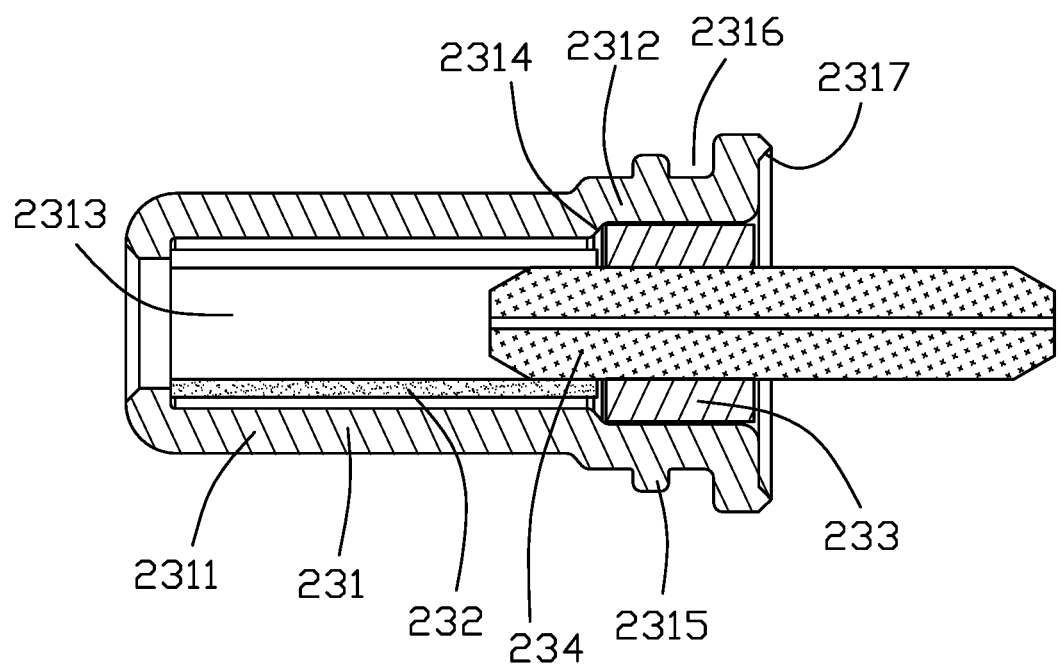
FIG. 17 is a cross-sectional view of the transmitter optical sub-assembly as shown in FIG. 15, taken along line 17-17 in FIG. 15.
Figure 18:
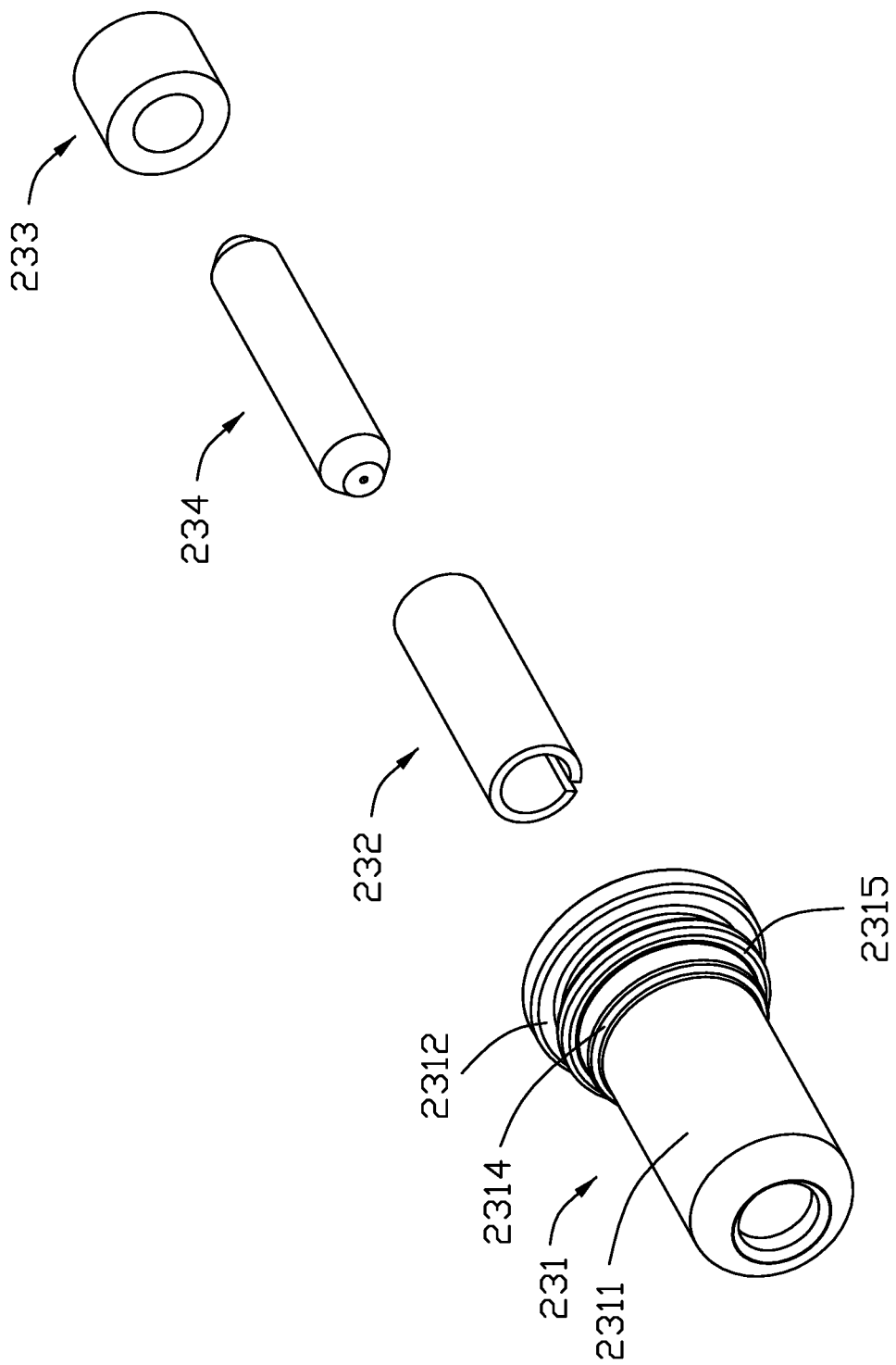
FIG. 18 is an exploded view of the transmitter optical sub-assembly as shown in FIG. 15.
Figure 19:
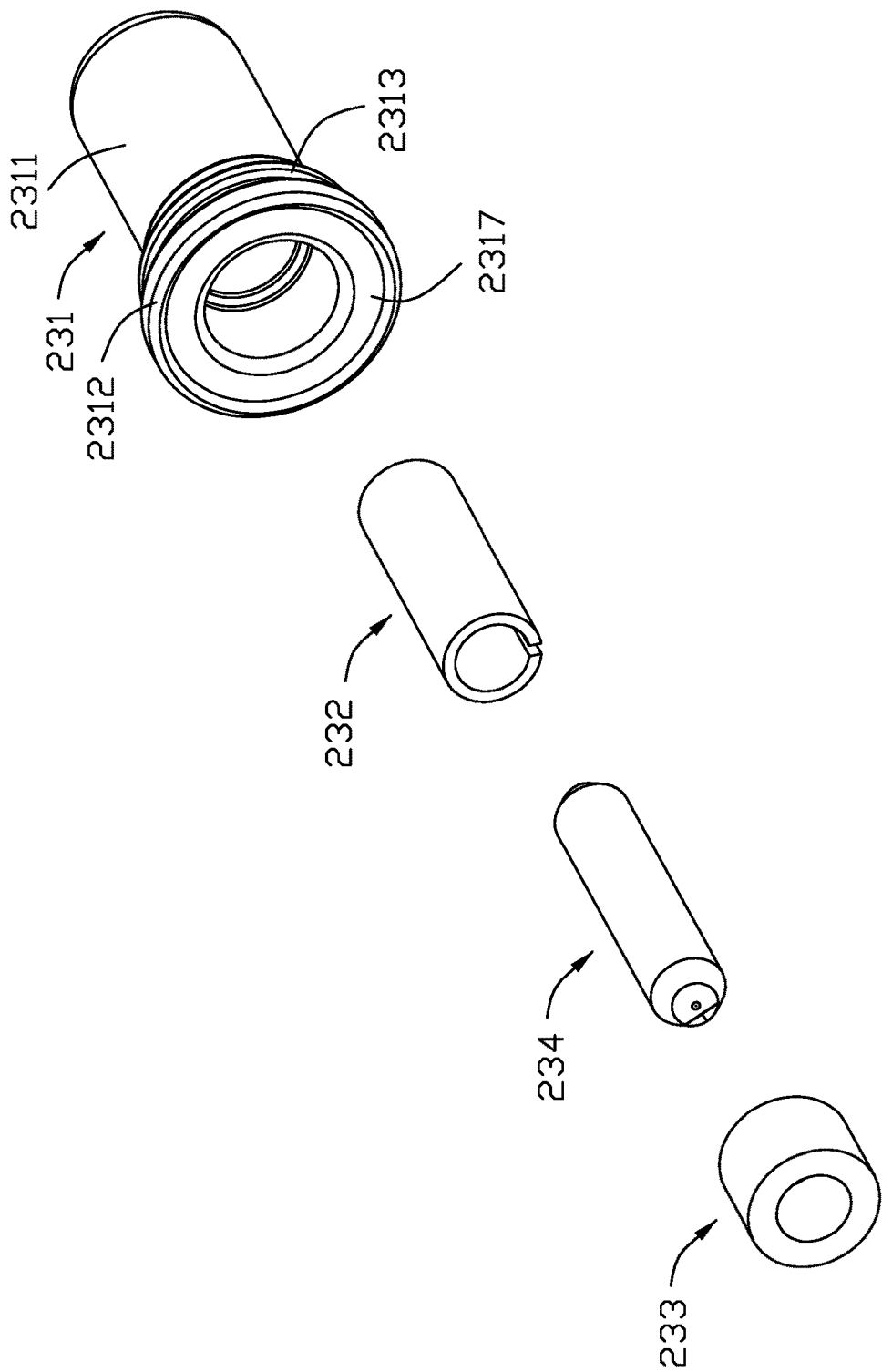
FIG. 19 is an exploded view similar to the FIG. 15, but from a different aspect.

Reference will now be made in detail to preferred embodiments of the present invention.

Referring to FIGS. 1 to 5, a traditional transmitter optical sub-assembly 100 comprises a receptacle 1 and a TOSA body 2 connected with the receptacle 1. The receptacle 1 is made of precision machined parts such as split sleeve 10, fiber stub 20, a nose body 30 for enclosing and disposing he split sleeve 10, and a receptacle body 40 connected on a rear end of the nose body 30 for fixing the fiber stub 20. The fiber stub 20 is received in the nose body 30 for mating fiber stub, and enclosed by a rear end of the split sleeve 10. The receptacle 1 may be attached to the TOSA body 2 by laser welding process (spot welding). This process involves moving the receptacle 1 in 3 axes for alignment purpose giving low units per hour during manufacturing.

Referring to FIGS. 6 to 10, a first embodiment of a receptacle 21 of a transmitter optical sub-assembly 200 is disclosed. The receptacle 21 involves parts made from high volume manufacturing methods like deep drawing and cold forging, since the deep drawing and cold forging methods of manufacturing does not involve material scrap (as in machining), the cost of receptacle 21 is expected to be only a fraction of the machined version. The receptacle 21 includes a cylindrical first nose body 211, a cylindrical first split sleeve 212 enclosed in a front end of the first nose body 211, a first sleeve enclosed in a rear end of the first nose body 211 and a cylindrical first fiber stub 214 received in a barrel-shaped opening of the first sleeve 213 and a rear end of the first split sleeve 212. The cylindrical first sleeve 213 is disposed behind a rear end of the first split sleeve 212 and received in a rear end of the first nose body 211. The first nose body 211 includes a front portion 2111, an opposite rear portion 2112 and a receiving opening 2113 through the first nose body 211 from a front surface to a rear surface. The outside diameter of the front portion 2111 of the first nose body 211 is smaller than the outside diameter of the rear portion 2112 of the first nose body 211, and the inside diameter of the front portion 2111 of the first nose body 211 is smaller than the inside diameter of the rear portion 2111 of the first nose body 211, and the wall thickness of the first nose body 211 is uniform from the front portion 2111 to the rear portion 2112, thus a step portion 2114 is formed on a medium position thereof for the transition between the front portion 2111 and the rear portion 2112. The outer diameter of the first fiber stub 214 is smaller than the inner diameter of the front portion 2111 of the first split sleeve 212. The outer diameter of the first sleeve 213 is conforms to the inner diameter of the rear portion 2112 of the first nose body 211. The first sleeve 213 is made by extrude or deep drawn method. The first nose body 211 is made by deep draw or cold forged.

In the assembly of the present first embodiment, firstly, the first fiber stub 214 is either glued or shrink fit or press fit on to the first sleeve 213. Secondly, the first split sleeve 212 is slip fitted on to the first fiber stub 214. Thirdly, the assembly of the first fiber stub 214, the first sleeve 213 and the first split sleeve 212 is then either glued or press fitted to the first nose body 211. Lastly, the first nose body 211 is projection welded onto the TOSA body 2 directly or through a first body (not shown) of a material compatible with the TOSA body 2 of a traditional transmitter optical sub-assembly 100.

Referring to FIGS. 11 to 14, a second embodiment of a receptacle 22 of a transmitter optical sub-assembly 300 is disclosed. The receptacle 22 is integrated with a second body 223 and includes a plate-like first welding plate 225 fixed on a front surface of the second body 223. In the second embodiment, the second body 223 is part of the TOSA body 2 of a traditional transmitter optical sub-assembly 100. The receptacle 22 involves parts made from high volume manufacturing methods like deep drawing and cold forging, since the deep drawing and cold forging methods of manufacturing does not involve material scrap (as in machining), the cost of receptacle 22 is expected to be only a fraction of the machined version. The receptacle 22 includes a cylindrical second nose body 221, a cylindrical second split sleeve 222 enclosed in the second nose body 221, and a cylindrical first fiber stub 224 received in a barrel-shaped opening of the second body 223, the first welding plate 225 and a rear end of the second split sleeve 222. The outer diameter of the second fiber stub 224 is smaller than the inner diameter of the first split sleeve 212 and the first welding plate 225. The outer diameter of the second fiber stub 224 conforms to the inner diameter of the second body 223. The second body 223 is extruded or deep drawn. The second nose body 221 is deep drawn or cold forged.

In the assembly of the present second embodiment, firstly, the second fiber stub 224 is either glued or shrink fit or press fit on to the second body 223. Secondly, the second split sleeve 222 is slip fitted on to the second fiber stub 224. Thirdly, the first welding plate 225 is either glued and/or mechanically secured to the extruded second body 223. Fourthly, the assembly of the second fiber stub 224, the second body 223, the first welding plate 225 and the second split sleeve 222 is then either glued or press fitted to the second nose body 221. Lastly, the second nose body 221 is positioned with respect to the second fiber stub 224 and projection welded on to the first welding plate 225. The second nose body 221 can be directly welded on a the body 223 without the plate 225 provided the materials are compatible for welding.

In the first embodiment of a receptacle 21 of a transmitter optical sub-assembly 200, the receptacle 21 needs to be attached to a first body of a material compatible with the TOSA body 2 of a traditional transmitter optical sub-assembly 100. While in the second embodiment of the receptacle 22 of a transmitter optical stub assembly 300, the receptacle 22 is integrated with the second body 223 (as part of the TOSA body 2 of a traditional transmitter optical sub-assembly 100), and the second fiber stub 224 is pressed on to the second body 223.

Referring to FIGS. 15 to 19, a third embodiment of a receptacle 23 of a transmitter optical sub-assembly 400 is disclosed. The receptacle 23 involves parts made from high volume manufacturing methods like deep drawing and cold forging, since the deep drawing and cold forging methods of manufacturing does not involve material scrap (as in machining), the cost of receptacle 23 is expected to be only a fraction of the machined version. The receptacle 23 includes a cylindrical third nose body 231, a cylindrical third split sleeve 232 enclosed in a front end of the third nose body 231, a second sleeve 233 enclosed in a rear end of the third nose body 231 and a cylindrical third fiber stub 234 received in a barrel-shaped opening of the second sleeve 233 and a rear end of the third split sleeve 232. The cylindrical second sleeve 233 is disposed behind a rear end of the third split sleeve 232 and received in a rear end of the third nose body 231. The third nose body 231 includes a front portion 2311, an opposite rear portion 2312 and a receiving opening 2313 through the third nose body 231 from a front surface to a rear surface thereof. The outside diameter of the front portion 2311 of the third nose body 231 is smaller than the outside diameter of the rear portion 2312 of the third nose body 231, and the inside diameter of the front portion 2311 of the third nose body 231 is smaller than the inside diameter of the rear portion 2311 of the third nose body 231, and the wall thickness of the third nose body 231 is uniform from the front portion 2311 to the rear portion 2312, thus a step/transition portion 2314 is formed on a medium position thereof for the transition between the front portion 2311 and the rear portion 2312. The outer diameter of the third fiber stub 234 is smaller than the inner diameter of the front portion 2311 of the third split sleeve 232. The outer diameter of the second sleeve 233 is conforms to the inner diameter of the rear portion 2312 of the third nose body 231. The second sleeve 233 is made by extrude or deep drawn method. The third nose body 231 is made by deep draw or cold forged.

The third nose body 231 vertically defines a flange portion 2315 on the rear portion 2312, and the flange portion 2315 may be integrated with the third nose body 231 or be a separated piece attached to the third nose body 231. In this embodiment, the flange portion 2315 is used to lock the third nose body 231 in place. The flange portion 2315 creates a U-shape groove 2316 where in another piece can be inserted to prevent back and forth movement of the receptacle 23.

The third nose body 231 defines a lip portion 2317 on an outer edge of the rear surface thereof, which is for projection welding. The third nose body 231 is joined on a third body 235 of a material compatible with the TOSA body 2 of a traditional transmitter optical sub-assembly 100 by projection welding method through the lip portion 2317. The projection welding method is high yields as compared to the traditional spot welding reducing the assembly cost. As the lip portion 2317 contacts along the full circle, the welding is suppose to be more stable than the current spot welding method. In addition supplement, the projection welding geometry is shown only for illustration purposes. The geometry can have another shape/dimension to enable projection welding of the part.

Figure 20:
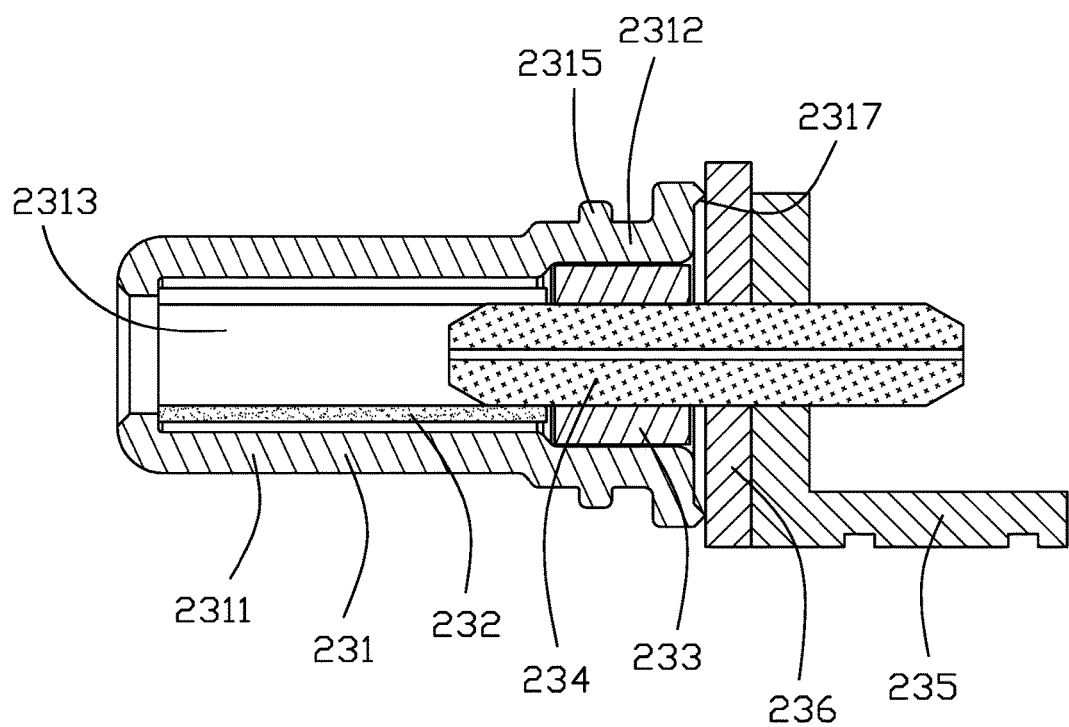
FIG. 20 is a cross-sectional view similar to the FIG. 17, but added second welding plat and third body.

Unlike the first embodiment of the receptacle 21, in the third embodiment of the receptacle 23, the third fiber stub 234 sticking out gets inserted in the third body 235 of a material compatible with the TOSA body 2 of a traditional transmitter optical sub-assembly 100 and projects out of the third body 235 as shown in the FIG. 20, the projection sticking out can be used to correctly position the third fiber stub 234 with respect to the third body 235.

In the assembly of the present third embodiment, firstly, the third fiber stub 234 is either glued or shrink fit or press fit on to the second sleeve 233. Secondly, the third split sleeve 222 is slip fitted on to the third fiber stub 234. Thirdly, the assembly of the third fiber stub 234, the second sleeve 233 and the third split sleeve 232 is then either glued or press fitted to the third nose body 231. Lastly, the lip portion 2317 of the third nose body 231 is projection welded on to the third body 235 of a material compatible with the TOSA body 2 of a traditional transmitter optical sub-assembly 100 or a second welding plate 236 of a material compatible with the first welding plate 225 of the receptacle 22 assembled on the third body 235.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmitter optical sub-assembly (TOSA) comprising:
    a TOSA body; and
    a receptacle assembled to a front side of the TOSA body, the receptacle including a nose body, a split sleeve enclosed by the nose body, a first body disposed behind the split sleeve and fully received within the nose body, and a fiber stub either glued or shrink fit or pressed fit on to the first body, a rear end of the split sleeve being slip fitted on to the fiber stub; wherein
    said nose body is unitarily of a cylindrical structure with at least two different diameters on two different areas along a front-to-back direction; wherein
    the nose body includes at least four sections along said front-to-back direction, a front section rearwardly extending from a front end of the nose body and having a first diameter and a first axial dimension, a flange section located at a rear end of the nose body and extending radially with a largest diameter, a rear section forwardly extending from the flange section and having a second diameter smaller than the that of the flange section while larger than the first diameter, and a second axial dimension larger than that of the flange section while smaller than the first axial dimension, and an oblique transition section located between the front section and the rear section.

2. The transmitter optical sub-assembly as claimed in claim 1, wherein said oblique transition section has both oblique outer surface and inner surface opposite to each other.

3. The transmitter optical sub-assembly as claimed in claim 1, wherein a front end of the first sleeve is essentially intimately located around the oblique transition section.

4. The transmitter optical-assembly as claimed in claim 1, wherein a nose body is made by either a deep drawing process with a constant thickness therealong, or a cold forging process with different thicknesses therealong.

* * * * *